United States Patent
McCreight et al.

(10) Patent No.: US 8,449,939 B2
(45) Date of Patent: May 28, 2013

(54) CROSSLINKABLE, CELLULOSE ESTER COMPOSITIONS AND FILMS FORMED THEREFROM

(75) Inventors: Kevin Wayne McCreight, Kingsport, TN (US); Douglas Claire Hoffman, Johnson City, TN (US); Wesley Raymond Hale, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 13/444,183

(22) Filed: Apr. 11, 2012

(65) Prior Publication Data

US 2012/0222793 A1 Sep. 6, 2012

Related U.S. Application Data

(62) Division of application No. 11/439,002, filed on May 23, 2006, now Pat. No. 8,304,086.

(60) Provisional application No. 60/684,808, filed on May 26, 2005.

(51) Int. Cl.
B05D 5/06 (2006.01)

(52) U.S. Cl.
USPC ........ 427/163.1; 427/394; 427/396; 427/415; 428/532

(58) Field of Classification Search
USPC ................ 427/163.1, 394, 396, 415; 428/532
See application file for complete search history.

(56) References Cited

U.S. PATENT DOCUMENTS

| | | | |
|---|---|---|---|
| 2,196,768 A | 4/1940 | Hiatt | |
| 3,022,287 A | 2/1962 | Mench et al. | |
| 3,833,289 A | 9/1974 | Schuler | |
| 5,219,510 A | 6/1993 | Machell et al. | |
| 5,994,530 A * | 11/1999 | Posey-Dowty et al. | 536/66 |
| 6,559,915 B1 | 5/2003 | Amimori et al. | |
| 6,710,923 B2 | 3/2004 | Ito | |
| 6,712,896 B2 | 3/2004 | Ono et al. | |
| 6,782,196 B1 | 8/2004 | Kuebler et al. | |
| 6,844,404 B2 | 1/2005 | Ponasik, Jr. et al. | |
| 8,304,086 B2 * | 11/2012 | McCreight et al. | 428/532 |
| 2002/0086163 A1 | 7/2002 | Shimizu et al. | |
| 2002/0162483 A1 | 11/2002 | Shimizu et al. | |
| 2003/0148134 A1 | 8/2003 | Ono et al. | |
| 2004/0008304 A1 | 1/2004 | Nair et al. | |
| 2004/0156110 A1 | 8/2004 | Ikeyama | |
| 2004/0247889 A1 | 12/2004 | Nakajima et al. | |

FOREIGN PATENT DOCUMENTS

| | | |
|---|---|---|
| JP | 35008114 | 6/1964 |
| JP | 1105738 | 4/1989 |
| JP | 56088440 | 7/1991 |
| JP | 1997095538 A | 4/1997 |
| JP | 1997095544 A | 4/1997 |
| JP | 1999021379 A | 1/1999 |
| JP | 2000352620 | 12/2000 |
| JP | 2003128838 | 5/2003 |
| JP | 2004244497 A | 9/2004 |
| JP | 2004292558 A | 10/2004 |
| WO | WO 9956178 | 11/1999 |
| WO | WO2004/038477 A1 * | 5/2004 |
| WO | WO 2004038477 A1 | 5/2004 |
| WO | WO2004/104121 A1 * | 12/2004 |
| WO | WO 2004104121 A1 | 12/2004 |

OTHER PUBLICATIONS

Kirk-Othmer, Cellulose Derivatives Esters, Encyclopedia of Chemical Technology, 3rd Edition, vol. 5, Wiley-Interscience, New York (1979), pp. 120-126.

Edgar, K.J.; Pecorini, T.J.; Glasser, W.G. In ACS Symposium Series 688: Long-Chain Cellulose Esters: Preparation, Properties, and Perspective; Cellulose Derivatives Modification, Characterization, and Nanostructures, Ed. Heinze, T.J. and Glasser, W.G. pp. 38-60, Jun. 2000.

Chapter 1 of "Hansen Solubility Parameters, a user's handbook", Solubility Parameters—An Introduction, by Charles M. Hansen, CRC Press, 2000.

The Technology of Plasticizers, J. Kern Sears and Joseph R. Darby, published by Society of Plastic Engineers/Wiley and Sons, New York, 1982, pp. 136-137.

Polymer reviews—A Practical guide to polymer miscibility, Coleman et al., Polymer 31, 1187 (1990).

Copending U.S. Appl. No. 11/439,002, filed May 23, 2006, Kevin Wayne McCreight.

USPTO Office Action dated Sep. 1, 2010 for U.S. Appl. No. 11/439,002.

USPTO Office Action dated Sep. 29, 2011 for U.S. Appl. No. 11/439,002.

USPTO Ex Parte Quayle Action dated Apr. 14, 2011 for U.S. Appl. No. 11/439,002.

USPTO Ex Parte Quayle Action dated Mar. 14, 2012 for U.S. Appl. No. 11/439,002.

* cited by examiner

Primary Examiner — Leszek Kiliman
(74) Attorney, Agent, or Firm — Louis N. Moreno

(57) ABSTRACT

New compositions for forming films for use in optical devices are provided. The compositions comprise a cellulose and a crosslinking agent dissolved or dispersed in a solvent system. Preferred celluloses are cellulose esters such as cellulose acetates, cellulose triacetates, cellulose acetate phthalates, and cellulose acetate butyrates. Preferred crosslinking agents are triazines such as those derived from melamine and benzoguanamine. The inventive compositions can be used to form, for example, protective and/or compensation films for use in polarizing plates.

22 Claims, No Drawings

CROSSLINKABLE, CELLULOSE ESTER COMPOSITIONS AND FILMS FORMED THEREFROM

RELATED APPLICATIONS

This application is a divisional of Ser. No. 11/439,002 now U.S. Pat. No. 8,304,086 filed May 23, 2006 entitled, CROSSLINKABLE, CELLULOSE ESTER COMPOSITIONS AND FILMS FORMED THEREFROM, and claims the priority benefit of a provisional application entitled, CROSSLINKABLE, CELLULOSE ESTER COMPOSITIONS AND FILMS FORMED THEREFROM, Ser. No. 60/684,808, filed May 26, 2005, incorporated by reference herein

BACKGROUND OF THE INVENTION

1. Field of the Invention

The present invention is broadly concerned with novel, crosslinkable, cellulose compositions useful for forming films for use in polarizing plates and other optical devices.

2. Description of the Prior Art

Cellulose ester films have been used for a variety of optical applications. More recently, cellulose esters have found use in liquid crystal displays due to their unique combination of transparency, good surface smoothness, optical isotropy, and optimal moisture vapor transmission rate (MVTR). Cellulose esters have found utility as protective films for polarizing plates, optical compensation films (phase retarders), substrate films for other functional films, and as various other functional films (e.g., anti-reflective films for plasma displays, films for organic electroluminescent displays).

For many years, solvent-cast cellulose triacetate films have been used as a photographic film support due to the tough, flame retardant nature of these materials. Additionally, triacetate films are widely used as protective layers of polarizer elements for LCD applications where its physical characteristics and the dimensional uniformity and surface quality imparted by solvent casting have made cellulose triacetate the first choice for many optical films.

Despite the excellent optical properties of solvent-cast, cellulose ester films, environmental concerns about solvents conventionally used in the casting of the films have created a need for new methods of manufacturing the films, or for a new kind of film support. It has been reported in the art that cellulose triacetate cannot be melt-cast because its melting point is above its decomposition temperature. As for solvent casting of cellulose triacetate, few solvents suitable for industrial use have been found that are more acceptable than the conventional ones, which are generally toxic and environmentally unfriendly.

One possible way to completely eliminate the need for solvents is to melt cast a thermally stable polymer such as poly(ethylene terephthalate). Indeed, this type of polymer is used commercially for the manufacture of supports for photographic sheet films such as x-ray films and graphic arts films. It is not suitable, however, for many kinds of optical films, including roll films for amateur cameras. In this use the polyester film develops curl or "core set" when wound on the film spool. Cellulose triacetate also develops curl when wound (and a certain amount of core set is desirable), but when the cellulosic film is exposed to moisture the curl of the hydrophilic cellulosic film is relaxed and the film lies flat. Poly(ethylene terephthalate) films, on the other hand, do not relax their core set with simple humidity, so they are unsatisfactory for photographic roll films. Other polymers lack one or more of the combination of properties and capabilities that make solvent cast cellulose triacetate successful as a preferred optical film relative to melt cast films.

Esters of cellulose hydroxyl groups have been made over a wide range with both single and mixed acids for different uses. In a cellulose ester, the extent of esterification with a given substituent is described as the degree of substitution (DS), in which the maximum substitution per anhydroglucose unit is typically three. Cellulose diacetate (DSac=2.45), unlike the triacetate, has a sufficiently low melting point that, with adequate plasticizer addition, it can be melt extruded, thus avoiding the need for toxic and environmentally unfriendly solvents. Mixed esters, or replacement of acetyl groups of the triacetate with appropriate levels of propionic, butyric, or other higher ester groups can accomplish the same purpose. Films made from these known cellulose ester compositions of lower acetyl content are generally deficient in properties that are necessary for photographic roll film supports, most notably in stiffness and heat distortion temperature.

Additionally, in recent years, there has been a drive for thinner, lighter, highly transparent optical films with improved heat resistance, moisture resistance, chemical resistance, dimensional stability, and mechanical strength. As films become thinner, a wide range of issues are encountered. For example, films may become less uniform in thickness, the surface may become mottled, ultraviolet (UV) light resistance may decrease, the MVTR may increase, and dimensional stability may suffer.

With respect to protective films for polarizer plates, as the film thickness is reduced, the MVTR increases, which results in less durable polarizing plates, especially under high temperature, high humidity environments. It is known that increased plasticizer content can decrease the MVTR, but elevated plasticizer levels reduce the glass transition temperature (Tg) of the cellulose ester films, which is associated with deterioration of dimensional stability of the film. In addition, it has been shown that an increase in the loading of plasticizer can lead to exudation of the plasticizer to the surface of the cellulose ester films, which can result in inhomogeneous plasticizer distribution or contamination of the film web or rolls.

Cellulose esters used as protective films for polarizer plates also may contain UV absorbers to protect the polarizing element from UV light. As protective films become thinner, the films cannot shield a sufficient amount of UV light. Consequently, additional UV absorber is required, which may exude out of the cellulose ester and contaminate the film web or rolls, or may lead to increased haze in the finished film. A thin protective film for polarizer plates with excellent MVTR, excellent film performance and dimensional stability, good plasticizer retention, and good UV absorber retention is required.

Unfortunately, cellulose esters are also used as optical compensation films for LCDs. These films may be manufactured by coating a liquid crystalline compound-containing solution on an anisotropic cellulose ester film. As in the case of the protective films for polarizing plates, UV absorbers are added to the compensation films. Exudation of the UV absorber in compensation films may lead to haze in the film, or the exudates may contaminate the liquid crystalline compound, leading to disordering of the liquid crystalline compounds. An optical compensation film for polarizer plates with excellent dimensional stability, excellent film performance, and good UV absorber retention is needed.

Thin cellulose ester films typically suffer from increased MVTR and reduced dimensional stability. In addition, cellulose ester films may exude plasticizers and/or UV absorbers under certain conditions, including reduced film thickness, elevated temperature, and elevated humidity. Attempts have been made to address these issues through addition of alternative compounds to the cellulose ester compositions, through application of hard coats to cellulose ester films, or through use of alternative materials to cellulose esters.

SUMMARY OF THE INVENTION

The present invention overcomes these problems by broadly providing new, crosslinkable, cellulose compositions that can be used to form films that have improved dimensional stability and MVTR.

In one embodiment, the present invention provides a composition comprising a cellulose ester and/or cellulose ether and a triazine crosslinking agent dispersed or dissolved in a solvent system. The composition, when formed into a cured film having a thickness of from about 0.5 to about 15 mils, will transmit at least about 80% of light having a wavelength of about 400 to 700 nm.

In another embodiment, a polarizing plate for use in optical display devices and methods of forming such plates are provided. The polarizing plates comprise a polarizing film having first and second outer surfaces and a companion film (e.g., protective film, compensation film) supported on, or adjacent to, at least one (and preferably both) of these outer surfaces. The companion film comprises a cellulose such as a cellulose ether or cellulose ester crosslinked with a triazine crosslinking agent.

In one embodiment, the crosslinking agent has the formula

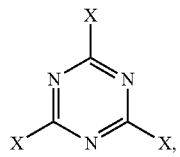

where each X is individually selected from the group consisting of phenyl groups and —$NR_2$. Each R is individually selected from the group consisting of hydrogen, alkoxyalkyl groups, carboxyl groups, and hydroxymethyl groups. In another embodiment, at least one R is selected from the group consisting of alkoxyalkyl groups, carboxyl groups, and hydroxymethyl groups, at least one X is —$NR_2$, and at least one R is selected from the group consisting of alkoxyalkyl groups, carboxyl groups, and hydroxymethyl groups.

In another embodiment, the crosslinking agent comprises at least one group having the formula —OR', where R' is an alkyl. In another embodiment, the crosslinking agent is preferably free of epoxy groups and free of groups having the formula

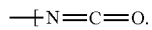

DETAILED DESCRIPTION OF THE PREFERRED EMBODIMENTS

The present invention broadly provides novel, crosslinkable, cellulose compositions that can be used to form crosslinked films having superior dimensional stability and moisture vapor transmission rates (MVTR). The invention also provides methods of using these compositions to form films to be used in optical devices.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

As used herein, the articles "a," "an" and "the" include their plural referents unless the context clearly dictates otherwise. For example, reference to a "polymer," or a "shaped article," is intended to include the processing or making of a plurality of polymers, or articles. References to a composition containing or including "an" ingredient or "a" polymer is intended to include other ingredients or other polymers, respectively, in addition to the one named.

By "comprising" or "containing" or "including," it is meant that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded.

It is also to be understood that the mention of one or more method steps does not preclude the presence of additional method steps before or after the combined recited steps or intervening method steps between those steps expressly identified. Moreover, the lettering of process steps or ingredients is a convenient means for identifying discrete activities or ingredients and the recited lettering can be arranged in any sequence, unless otherwise indicated.

The compositions of the invention preferably comprise a cellulose and a crosslinking agent dissolved or dispersed in a solvent system. The cellulose can be in any physical shape (e.g., pellets, powders, granules, fibers) and is preferably selected from the group consisting of cellulose ethers and cellulose esters, with cellulose esters being the most preferred. In one embodiment, the cellulose ester has a degree of hydroxyl substitution (i.e., the number of hydroxyl substituents per anhydroglucose unit) of from about 0.05 to about 1.5, and preferably from about 0.1 to about 0.9. The preferred acetyl degree of substitution is from about 0.01 to about 3.0. Preferred propionyl degree of substitution is from about 0.3 to about 3.0. Preferred butyryl degree of substitution is from about 0.01 to about 3.0, while preferred carboxymethyl degree of substitution is from about 0.01 to about 0.5.

In one embodiment, the cellulose is a cellulose acetate having a degree of substitution of acetyl groups of from about 1.5 to about 2.49. In another embodiment, the cellulose is a cellulose triacetate having a degree of substitution of acetyl groups of from about 2.81 to about 3.0, and preferably from about 2.83 to about 2.88. In another embodiment, the cellulose is a cellulose propionate having a degree of substitution of propionyl groups of from about 0.3 to about 3.0. In another embodiment, the cellulose is a cellulose butyrate having a degree of substitution of butyryl groups of from about 0.3 to about 3.0.

Preferred cellulose acetate butyrates have a degree of substitution of acetyl groups of from about 0.01 to about 1.5, more preferably from about 0.03 to about 1.45, and a degree of substitution of butyryl groups of from about 0.1 to about 2.9, more preferably from about 0.7 to about 2.7. Preferred cellulose acetate propionates have a degree of substitution of acetyl groups of from about 0.01 to about 1.5, and more preferably from about 0.03 to about 1.45, and a degree of substitution of propionyl groups of from about 0.1 to about 2.9, and more preferably from about 0.6 to about 2.7.

Preferred cellulose propionate butyrates have a degree of substitution of propionyl groups of from about 0.1 to about 2.9, more preferably from about 0.5 to about 2.5, and a degree of substitution of butyryl groups of from about 0.1 to about 2.9, more preferably from about 0.5 to about 2.5. Preferred carboxymethyl cellulose acetate butyrates have a degree of substitution of carboxymethyl groups of from about 0.01 to about 1.0, more preferably from about 0.05 to about 0.6; a degree of substitution of acetyl groups of from about 0.05 to about 1.0, more preferably from about 0.1 to about 0.6; and a degree of substitution of butyryl groups of from about 0.5 to about 2.5, more preferably from about 1.5 to about 1.8.

Preferred cellulose esters will have a weight average molecular weight of from about 5,000 to about 400,000 g/mol, more preferably from about 100,000 to about 300,000 g/mol, and even more preferably from about 125,000 to about 250,000 g/mol. Gel permeation chromatography can be used to determine the absolute molecular weights. In this procedure, 50 mg of cellulose ester is dissolved in 10 mL of tetrahydrofuran with 10 microliters of toluene as a flow rate marker, and 50 microliters are injected onto a Polymer Laboratories column set with refractive index detection.

Preferred cellulose esters comprise $C_1$-$C_{20}$ esters of cellulose, more preferably $C_2$-$C_{20}$ esters of cellulose, and even more preferably $C_2$-$C_{10}$ esters of cellulose and yet even preferably $C_2$-$C_4$ esters of cellulose. Secondary and tertiary cellulose esters are also preferred. Particularly preferred cellulose esters for use in the present invention are selected from the group consisting of cellulose acetate, cellulose triacetate, cellulose acetate phthalate, cellulose acetate butyrate, cellulose butyrate, cellulose tributyrate, cellulose propionate, cellulose tripropionate, cellulose acetate propionate, carboxymethylcellulose acetate, carboxymethylcellulose acetate propionate, carboxymethylcellulose acetate butyrate, cellulose acetate butyrate succinate, cellulose propionate butyrate, and mixtures thereof.

In some embodiments, the cellulose esters may also be substituted with hydrogen or $C_1$-$C_{20}$ (more preferably $C_1$-$C_{10}$, and even more preferably $C_2$-$C_8$) alkanoyls, $C_1$-$C_{20}$ (more preferably $C_1$-$C_{10}$, and even more preferably $C_2$-$C_8$) branched alkanoyls, $C_7$-$C_{20}$ aroyls, and/or $C_2$-$C_{20}$ (more preferably $C_1$-$C_{10}$, and even more preferably $C_2$-$C_8$) heteroaroyl substituents, wherein the heteroatoms are preferably selected from the group consisting of nitrogen, oxygen, and sulfur.

The cellulose ester or ether is preferably utilized at sufficient levels that the composition comprises from about 1% to about 50% by weight cellulose ester or ether, preferably from about 5% to about 40% by weight cellulose ester or ether, and even more preferably from about 15% to about 35% by weight cellulose ester or ether, based upon the total weight of the composition taken as 100% by weight.

In one embodiment, the preferred crosslinking agent comprises a triazine crosslinking agent. Preferred triazine crosslinking agents are substituted melamines. In one embodiment, the substituted melamines have the formula

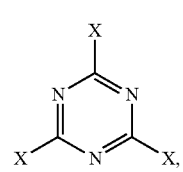

wherein each X is individually selected from the group consisting of phenyl groups and —$NR_2$. Each $R_2$ is individually selected from the group consisting of hydrogen, alkoxyalkyl groups (preferably $C_1$-$C_{20}$, more preferably $C_1$-$C_{10}$, and even more preferably $C_1$-$C_6$), alkoxy groups (preferably $C_1$-$C_{20}$, more preferably $C_1$-$C_{10}$, and even more preferably $C_1$-$C_6$), carboxyl groups, and hydroxymethyl groups. In one preferred embodiment, at least two of the X groups are —$NR_2$. Even more preferably, all three X groups are —$NR_2$.

Preferably, at least one R group (more preferably at least two R groups, and even more preferably at least four R groups) is selected from the group consisting of alkoxyalkyl groups, carboxyl groups, alkoxy groups, and hydroxymethyl groups. In another preferred embodiment, every R group is selected from the group consisting of alkoxyalkyl groups, carboxyl groups, alkoxy groups, and hydroxymethyl groups. A preferred crosslinking agent according to this embodiment comprises at least one R that is an alkoxyalkyl group such as a methoxymethyl group.

In another preferred embodiment, all three X groups are —$NR_2$, and each R is an alkoxyalkyl group such as a methoxymethyl group. One such crosslinking agent is sold under the name CYMEL® 303 (Cytec Industries, Inc.).

In another embodiment, the crosslinking agent comprises at least one (preferably at least two, and more preferably at least four) group that is capable of reacting with an —OH group on the cellulose. Preferably, this group has the formula —OR', where R' is an alkyl (preferably $C_1$-$C_{20}$, more preferably $C_1$-$C_{10}$, even more preferably $C_1$-$C_6$, and yet even more preferably $C_2$-$C_4$).

In another embodiment, the crosslinking agents are free of epoxy groups and free of groups having the formula

That is, each mole of crosslinking agent includes one or fewer such groups, and more preferably no (zero) such groups.

The most preferred crosslinking agents are triazines such as those derived from melamines (i.e., substituted melamines that are functional for crosslinking with the cellulose). It is also preferred that the crosslinking agents react at temperatures of from about 100° C. to about 175° C. and more preferably from about 120° C. to about 150° C.

Other potential crosslinking agents include, but are not limited to, polyfunctional compounds containing groups such as aziridene groups, oxazoline groups, aldehyde groups, carbonyl groups, hydrazine groups, methanol groups, and active methylene groups. Also, a vinylsulfonic acid, an acid anhydride, a cyanoacrylate derivative, ethylenically unsaturated compounds, an etherified methylol, and/or a metal alkoxide (tetramethoxysilane) could be utilized. Suitable ethylenically unsaturated crosslinking agents include, but are not limited to, divinyl benzene, allyl methacrylate, allyl acrylate, multifunctional acrylates, and mixtures thereof. Suitable multifunctional acrylates include, but are not limited to, ethylene diol dimethacrylate, ethylene diol diacrylate, trimethylolpropane triacrylate, trimethylolpropane trimethacrylate, pentaerythritoltetraacrylate, and mixtures thereof.

The crosslinking agent is preferably utilized at sufficient levels that the stoichiometry between the hydroxyl equivalent weight of the crosslinking agent and the combined hydroxyl equivalent weight of all cellulose esters and/or cellulose ethers present in the composition ranges from about 0.1 to about 10, preferably from about 0.25 to about 7, and even more preferably from about 0.5 to about 5. Hydroxyl number (OHN) may be determined by ASTM D1957. Hydroxyl equivalent weight (HEW) is determined by taking 56,100/OHN.

The solvent system utilized with the present invention can include one or more solvents and can be selected based upon the solubility parameters of the cellulose, crosslinking agent, and other ingredients present in the composition. Guidelines for selecting the solvent can be found in Coleman et al., Polymer 31, 1187 (1990), incorporated by reference herein.

Some typical solvents include, but are not limited to, those selected from the group consisting of lower alcohols (e.g., methanol, ethanol, propanol, butanol), methylene chloride, methyl acetate, ethyl acetate, amyl acetate, acetone, methyl ethyl ketone, methyl propyl ketone, methyl isobutyl ketone, methyl isoamyl ketone, methyl amyl ketone, diacetone alcohol, methyl acetate, ethyl acetate, isopropyl acetate, butyl acetate, isobutyl acetate, propylene glycol monomethyl ether, ethylene glycol monomethyl ether acetate, ethylene glycol monobutyl ether acetate, ethylene glycol diacetate, diethylene glycol monoethyl ether acetate, diethylene glycol monobutyl ether acetate, propylene glycol monomethyl ether acetate, dimethyl formamide, n-methyl-2-pyrrolidone, tetrahydrofuran, 1,3-dioxolane, 1,4-dioxane, cyclohexanone, ethyl formate, 2,2,2-trifluoroethanol, 2,2,3,3-tetrafluoro-1-propanol, 1,3-difluoro-2-propanol, 1,1,3,3,3-hexafluoro-2-methyl-2-propanol, 1,1,1,3,3,3-hexafluoro-2-propanol, 2,2,3,3,3-pentafluoro-1-propanol, nitroethane, and mixtures thereof. Advantageously, the present invention allows toxic solvents such as methylene chloride to be entirely avoided.

The solvent system is preferably utilized at sufficient levels that the composition comprises from about 5% to about 95% by weight solvent system, preferably from about 40% to about 90% by weight solvent system, and even more preferably from about 65% to about 85% by weight solvent system, based upon the total weight of the composition taken as 100% by weight. Preferred solvent systems will have a boiling point of from about 0° C. to about 200° C., more preferably from about 20° C. to about 150° C., and even more preferably from about 40° C. to about 120° C.

The overall solids content of the composition is typically from about 5% to about 95% by weight, preferably from about 10% to about 80% by weight, more preferably from about 15% to about 55% by weight, and even more preferably from about 18% to about 35% by weight, based upon the total weight of the composition taken as 100% by weight. The viscosity (as determined by a Brookfield viscometer using the appropriate spindle to maintain the torque reading between 10 and 90% of the maximum value at a rotational speed of 50/sec) of the composition is preferably from about 1 to about 200 Pa·s (pascal-second), preferably from about 5 to about 100 Pa·s, and more preferably from about 10 to about 50 Pa·s.

The inventive compositions can also include one or more optional additives. In one embodiment, the additive modifies or protects some property of the cellulose. Preferred additives include those selected from the group consisting of crosslinking catalyst (e.g., p-toluenesulfonic acid), plasticizers, thermal stabilizers, antioxidants, ultraviolet (UV) stabilizers, acid stabilizers, acid scavengers, dyes, pigments, optical brighteners, UV absorbents, coloring agents, fine particles (e.g., fumed silica), anti-retardation agents, and mixtures thereof. In one embodiment, the additive is selected to include functional groups (e.g., hydroxyls, amines) that are reactive with the selected crosslinking agent, thus minimizing and preferably eliminating exudation problems of prior art cellulose films.

The inventive compositions can be formed by mixing the cellulose with the solvent system. Typically, this will be carried out while heating the mixture, optionally under pressure (e.g., from about 0.11 to about 1.50 MPa), to temperatures of from about 40° C. to about 120° C., and more preferably from about 50° C. to about 100° C., and for a time period of from about 0.5 hours to about 24 hours, and more preferably from about 2 hours to about 8 hours. The additives can be mixed into the composition simultaneous to the cellulose and solvent system mixing, or the additives can be added after the cellulose and solvent system mixing. It is preferred that the crosslinking agent be mixed after the cellulose and solvent system mixing in order to avoid premature crosslinking that could be caused by the heat applied during the mixing step. The composition can then be filtered using known filtration methods, if necessary, as it is preferred that the average particle size of foreign matter particles in the composition be less than about 50 μm.

Casting of Film

The casting process is one in which the dope composition as described above is conveyed to a pressure die through a pressure-type, metering gear pump, and cast from the pressure die onto a support for casting (e.g., a moving, endless metal belt or a rotating, metal drum) at a casting position. The surface of the support for casting is typically mirror-like.

The dope thickness can be adjusted and controlled with any known methods in the art, including, but not limited to, through the use of a doctor blade or a roller coater rotating reversely. A preferred pressure die for use in casting the film is one in which the shape of the opening at the mouth piece portion and the film thickness are readily regulated to be uniform. Examples of pressure dies include a coat hanger die and a "T" die.

In order to increase the casting speed, two or more pressure dies may be provided on the metal support and dopes divided into two or more portions may be simultaneously cast on the metal support. A laminated cellulose ester film can be prepared by simultaneously casting (co-casting), on a support, multiple dope compositions from a die with plural slits. A cellulose film is prepared by casting the cellulose dope obtained above on a support such as a belt or a drum. In the invention, a solution cast film manufacture process employing a belt is especially preferred because drying conditions on the support can easily be controlled.

In one embodiment, the films formed by the invention have a very low foreign matter particles, such that the number of foreign matter particles having a size of from about 10 to about 50 μm is preferably less than about 200 per 250 mm² (about 0.8 particles/mm²), and more preferably less than about 100 per 250 mm². Furthermore, the number of foreign matter particles having a size of greater than 50 μm is preferably less than about 2 per 250 mm², and more preferably about 0. The resulting solvent-cast cellulose film has a smooth surface, excellent light transmission, low haze, good stiffness, high dimensional stability, and low contaminant content. The solvent-cast films are also comparable, or superior, to high quality thin film transistor (TFT) grade cellulose triacetate films for LCD applications prepared by conventional solvent cast processes.

The resulting films may be isotropic or anisotropic depending on the conditions used during film casting and post film treatment. Isotropic films are useful as protective films for polarizer plates, and anisotropic films are useful as compensation films for improving the viewing angle of a display. Isotropic and anisotropic are defined by the refractive index values (n, determined by a Metricon 2010 prism coupler operating at a wavelength of 633 nm in TE and TM modes) in the three directions (x, y, z), where x and y are in the plane of the film and z is in the thickness direction of the film plane. The films of this invention can range from about 1 to about 1,000 mils in thickness, preferably from about 1 to about 100 mils in thickness, more preferably from about 1 to about 10 mils in thickness, and even more preferably from about 1 to about 5 mils in thickness.

Retardation values in the plane of the film ($R_o$) are defined by:

$$R_o = (n_x - n_y) * \text{film thickness.}$$

Retardation values in the thickness direction of the film ($R_t$) are defined by:

$$R_t = [(n_x + n_y)/2 - n_z] * \text{film thickness.}$$

A film useful as a protection film is considered to be isotropic if $R_o$ and $R_t$ is 200 nm or less, and a film useful as a compensation film is considered to be anisotropic if $R_o$ and $R_t$ are greater than 200 nm. These retardation values can be controlled to target either compensation films or protective films by adjusting the film thickness, the stretch ratio, the stretching temperature, and the film composition (e.g., cellulose type and additives used). Films used for protection of polarizers preferably have retardation values ($R_o$ and $R_t$) of less than about 100 nm, preferably less than about 50 nm, and more preferably less than about 30 nm. Films used as compensation films have retardation values ($R_o$ and $R_t$) of at least about 50 nm, preferably at least about 80 nm, and more preferably at least about 120 nm. For certain display types (e.g., TN [twisted nematic], HAN [hybrid aligned nematic], IPS [in plane switching], VA [vertically aligned], π-cell or OCB [optically compensated bend]), the retardation values ($R_o$ and $R_t$) can be at least about 200 nm, preferably at least about 250 nm, more preferably at least about 300 nm, and even more preferably at least about 350 nm. A retardation film can be used in combination with, or substituted for, one or both of the polarizer protection films.

Solvent Evaporation Process

The solvent evaporation process is one in which a web (film) is heated on a support for casting, and solvents are evaporated. Solvent evaporation methods include blowing air from the web side, and/or a heating from the reverse surface of the support employing liquid. Another solvent evaporation method that is suitable involves heating both surfaces employing heat radiation. Of these, the reverse surface liquid heating method is preferred due to high drying efficiency. These methods can also be combined. The cast web is dried (preferably on the support) at a temperature of from about 30° C. to about 100° C. Heating the web to these temperatures is preferably carried out employing air having that temperature, or via an infrared ray heater.

The peeling process is one in which a web that has been subjected to evaporation of solvents on the support is peeled from the support. The peeled web is then conveyed to the subsequent processing step. When the residual solvent amount is too large, it may be difficult to peel the web. When peeling is carried out after fully drying the web on the support, a part of the web may peel prior to the peeling position.

It is preferred in the invention that the temperature at the peeling position on the support be from about 10° C. to about 40° C., and preferably from about 11° C. to about 30° C. The residual solvent level at the peeling position is preferably from about 10% to about 120% by weight of the weight of solids in the film at the peeling position, and more preferably from about 25% to about 100% by weight of the weight of solids in the film at the peeling position. In order to adjust the residual solvent to the amount described above at the peeling position, the temperature of the support at the peeling position is preferably set at the range described above so that evaporation of the organic solvent may be effectively carried out by controlling the temperature of the surface of the support for casting. In order to control the temperature of the support, a heat transfer method having a good efficiency of heat transfer (e.g., heat transfer from the rear surface of the support) is preferred.

When the support is a rotating belt, and is at the lower position, the temperature of the belt can be controlled by mildly blowing hot air onto the support. The support temperature can be varied at the different positions of the support through different heating methods and can be varied at the casting position on the support, at the drying position on the support, or at the peeling position on the support.

A gel casting method can increase the film-forming speed in instances where the amount of residual solvents is relatively great. The gel casting method comprises adding poor solvents (with respect to the cellulose ester) to the dope, and gelling after casting the dope. Another gel casting method comprises gelling by decreasing the temperature of the support. It is possible to carry out earlier peeling and to increase the casting speed by strengthening the web through gelling the dope on the support.

Drying Process: Protective Film for Polarizing Plates

The web is preferably dried via a drying apparatus in which the web is alternatively transported through staggered rollers. Or, drying can be accomplished with a tenter apparatus in which the web is transported while holding both edges of the web employing clips. In the drying process, a transport tension for transporting the web is preferably low until the residual solvent amount is less than about 5% by weight.

The drying methods are not specifically limited and can be accomplished by, for example, hot air, infrared radiation, heated rolls, or microwave. The hot air method is preferred due to its simplicity. To enhance dimensional stability, the drying temperature is preferably raised stepwise in 3 to 5 steps within the range of from about 40° C. to about 150° C., and more preferably from about 80° C. to about 140° C. Rapid drying tends to degrade the smoothness of the finished film.

High temperature drying is preferably applied to the web having a residual solvent content of less than about 8% by weight of the total weight of solids in the film. During the entire drying process, the drying temperature is commonly from about 40° C. to about 250° C., and preferably 40° C. to about 160° C. Crosslinking (curing) of the cellulose ester film occurs during the drying stage, and may be catalyzed thermally or with radiation. Elevated temperatures allow deblocking of crosslinkers such that the crosslinking reaction can proceed to yield films with heat stability, dimensional stability, solvent resistance, and chemical resistance. Cellulose acetates with a degree of substitution of acetyl of less than about 2.49, and cellulose triacetates with a degree of substitution of acetyl of greater than about 2.81 are preferably cured by radiation (e.g., UV light). Cellulose esters of higher fatty acids or those of mixed esters are cured by either radiation or thermal methods.

In the drying process, the web tends to shrink in the transverse direction due to evaporation of the organic solvent. When the web is dried rapidly at a higher temperature, the tendency of the web to shrink is stronger. Drying of the web while minimizing shrinkage as much as possible improves the flatness of the finished cellulose ester film. In view of the above, a method disclosed in Japanese Patent O. P.I. Publication No. 62-46625, incorporated by reference herein, is preferably utilized. This method comprises drying the web while holding both edges in the transverse direction of the web by clips or pins to maintain the web width (referred to as "a tenter method").

The cellulose ester film peeled from the support or coming out of a tenter is preferably further dried in the drying process to give a residual solvent content in the film of less than about 0.5% by weight, preferably less than about 0.1% by weight, and more preferably less than about 0.01% by weight, based upon the total weight of film taken as 100% by weight.

Drying Process: Cellulose Esters for Compensation Films

In order to obtain optically biaxial orientation, any known method can be utilized. In one preferred method, stretching of the film is carried out while solvents are still present in the film. That is, while the web (film) is being peeled from the casting support, it is stretched in at least one direction by a factor of from about 1.0 to about 4.0, more preferably from about 1.01 to about 6.0, and even more preferably from about 1.1 to about 3.5. During stretching, the residual solvent in the web is present at levels of from about 10 to about 100% by weight, preferably from about 10% to about 50% by weight, and more preferably from about 20% to about 40% by weight based upon the solids in the film taken as 100% by weight. When the residual solvent amount in the web is excessively large, stretching effects are not obtained. On the other hand, when the residual solvent amount is excessively small, stretching becomes markedly difficult, and the web is occasionally broken. Furthermore, when the stretching factor is excessively small, it is difficult to obtain sufficient phase difference, and when the stretching factor is excessively large, stretching becomes difficult, and the web is occasionally broken. The temperature during stretching is preferably from about 25° C. to about 160° C.

By carrying out biaxial stretching in which the stretching directions are orthogonal to each other, it is possible to decrease thickness variations in the stretched film. When the thickness variation of the cellulose film support is excessively large, non-uniform phase difference occurs, which results in problems such as coloration. The thickness variation of the cellulose film support is preferably in the range of ±3 percent, and is more preferably in the range of ±1 percent over any area that is 500 mm$^2$.

Methods to stretch the web are not particularly limited, and include, for example, a method in which a plurality of rolls rotate at different circumferential speeds, and stretching in the longitudinal direction is carried out utilizing the different circumferential speeds during the rotation of rolls. Another method involves securing both edges of the web with clips or pins, and stretching in the longitudinal direction by increasing the distance between clips or pins in the advancing direction. Another method comprises lateral stretching by increasing the distance between the clips or pins in the lateral direction. Yet another method involves simultaneous longitudinal stretching and lateral stretching by increasing the distance between the clips or pins in the longitudinal direction as well as in the lateral direction. Each of these methods may be employed in combination. Furthermore, in the case of the so-called tenter method, it is preferable to drive a clip portion employing a linear drive system so as to make it possible to carry out smooth stretching and to minimize the risk of film breakage.

The finished film, after stretching, preferably has residual solvent levels in an amount of less than about 2% by weight, and more preferably less than about 0.4% by weight, based upon the total weight of the film taken as 100% by weight.

Regardless of the foregoing drying processes, in one embodiment, the cured film is highly transparent. That is, at thicknesses of about 0.5 to 15 mils, the film will transmit at least about 80%, preferably at least about 90%, and even more preferably at least about 95% of light having a wavelength of about 400 to 700 nm. The % of light transmitted can be determined by a double beam UV-VIS spectrometer.

Winding Process

After the residual solvent content of the film is at the levels discussed above, the film is typically wound around a spool for later use. Any conventional winding method can be used, and examples of the winding methods include a constant torque method, a constant tension method, a taper tension method, and a method programmed so as to have a constant inside stress.

The thickness of the cellulose ester film can be adjusted by controlling composition concentrations, composition amounts supplied by a pump, the slit width of the mouth piece portion of a die, an extrusion pressure of a die, or a moving speed of a support for casting. It is preferred that the thickness of the film be uniformly regulated by feeding back thickness information detected by a thickness detector to the devices described above through a system programmed in advance for information to be fed back to them.

The optimum thickness of the film at winding is different depending upon end use. The thickness of the film is ordinarily from about 5 μm to about 500 μm, and preferably from about 10 μm to about 200 μm. The thickness of a film used in a liquid crystal display (LCD) is preferably from about 10 μm to about 120 μm. The films of the invention have good moisture vapor transmittances, and excellent dimensional stabilities, even when reduced to thicknesses of from about 10 μm to about 60 μm.

After the cellulose film of the invention is stored at about 80° C. and at about 90% RH for 48 hours, the rate of dimensional change in the machine direction (MD) of the film and the rate of dimensional change in the transverse direction (TD) of the film both are preferably less than about ±0.5%, more preferably less than about ±0.3%, and even more preferably less than about ±0.1%. The rate of dimensional change in the machine direction is determined by taking [(L1−L2)/L1]*100, where L1 is the initial width of the sample in the machine direction prior to processing, and L2 is the width of the sample in the machine direction after processing. The rate of dimensional change in the transverse direction is determined by taking [(L3−L4)/L3]*100, where L3 is the initial width of the sample in the transverse direction prior to processing and L4 is the width of the sample in the transverse direction after processing.

Utility of Crosslinked Films

In one embodiment, the films of the invention are preferably utilized as part (e.g., polarizing plate protective film) of a liquid crystal display (LCD) in view of their good moisture vapor permeation and dimensional stability. A polarizing plate using the inventive films can be prepared according to any conventional method. There is, for example, a method in which an optical or cellulose film is subjected to an alkali saponification, and the resulting companion film is adhered through an aqueous, completely saponified, polyvinyl alcohol solution to both surfaces of a polarizing film. The polarizing film is typically prepared by immersing a polyvinyl alcohol film in an iodine solution, and stretching the resulting film. The alkali saponification refers to treatment in which the optical or cellulose film is immersed in a strong alkali solution at above ambient temperatures (e.g., from about 30° C. to about 50° C.) for about 60 seconds in order to enhance wettability of the film to an aqueous adhesive and provide good adhesion to the film.

The polarizing plate obtained above is provided on one or both sides of a liquid crystal cell, and the resulting material is installed in an LCD. A liquid crystal display employing the polarizing plate of the invention can maintain stable, long-term display performance.

The films of the invention can also be used as compensation films for LCDs, which can also maintain stable, long-term display performance. Alternatively, the films of the invention are also used for an anti-reflection film, a reflection plate, an anti-glare film, a non-reflection film, anti-static film, or a film provided with two or more of the foregoing functions. Depending upon the final use, the companion film can be adhered with or without an adhesive to the polarizing film or other support, or the companion film can simply be positioned adjacent the polarizing film or other support.

EXAMPLES

The following examples set forth preferred methods in accordance with the invention. It is to be understood, however, that these examples are provided by way of illustration and nothing therein should be taken as a limitation upon the overall scope of the invention.

Prophetic Example 1

1. Preparation of Dope Composition

The dope components set forth in Table 1 are charged to a closed vessel and heated to 60° C. The cellulose acetate propionate (CAP) is completely dissolved with stirring to obtain a dope. The time required for dissolution is 4 hours. The dope composition is filtered and, while being maintained at 35° C., is uniformly cast on a stainless steel band support maintained at 30° C.

TABLE 1

| INGREDIENT | PARTS BY WEIGHT |
|---|---|
| cellulose acetate propionate[A] | 100 |
| methyl ethyl ketone | 550 |
| triphenyl phosphate | 10 |
| melamine crosslinking agent[B] | 15 |
| p-toluene sulfonic acid | 0.4 |
| light stabilizer/UV absorber[C] | 0.1 |
| UV light absorber[D] | 0.1 |
| UV light absorber[E] | 0.2 |

[A]46% by weight propionyl; available from Eastman Chemical Company under the name CAP 480-20.
[B]CYMEL ® 303, available from Cytec Industries, Inc.
[C]Tinuvin ® 326, available from Ciba.
[D]Tinuvin ® 109, available from Ciba.
[E]Tinuvin ® 171, available from Ciba.

The dope is peeled from the stainless band support after it is dried to such an extent that it is peelable. Residual solvent in the dope is 25% at this time. The period of time required from casting to peeling of the dope is 3 minutes. After being peeled from the support, the film is dried and crosslinked at 120° C. while being held in the transverse direction. The transverse tension is then released, and drying and crosslinking are completed in a drying zone at a temperature of 120-135° C., while being transported by a number of rolls. The dried film is wound on a roll, and has a final thickness of 40 µm.

2. Preparation of Polarizing Plate

The film samples prepared in Part 1 of this example are each subjected to an alkaline treatment in a 2.5 mol/L aqueous solution of sodium hydroxide at 40° C. for 60 seconds, and washed with water for 3 minutes to form a saponified layer to prepare an alkali-treated film. Next, a polyvinyl alcohol film (available from Kuraray Co., Ltd. under the name POVAL®) is immersed in 100 parts by weight of an aqueous solution containing 1 part by weight of iodine and 4 parts by weight of boric acid, and is stretched up to 4 times at 50° C. to obtain a polarizer film. Polarizing plate samples are prepared by laminating the foregoing alkali-treated film onto both surfaces of the polarizer film using an aqueous (5% by weight), completely saponified, polyvinyl alcohol as an adhesive.

Prophetic Example 2

1. Preparation of Dope Composition

The dope components set forth in Table 2 are charged to a closed vessel and heated to 60° C. The cellulose acetate butyrate (CAB) is completely dissolved with stirring to obtain a dope. The time required for dissolution is 4 hours. The dope composition is filtered and, while being maintained at 35° C., is uniformly cast on a stainless steel band support maintained at 30° C.

TABLE 2

| INGREDIENT | PARTS BY WEIGHT |
|---|---|
| cellulose acetate butyrate[A] | 100 |
| acetone | 550 |
| triphenyl phosphate | 10 |
| melamine crosslinking agent[B] | 15 |
| p-toluene sulfonic acid | 0.4 |

TABLE 2-continued

| INGREDIENT | PARTS BY WEIGHT |
| --- | --- |
| light stabilizer/UV absorber[C] | 0.2 |
| UV light absorber[D] | 0.1 |
| UV light absorber[E] | 0.2 |

[A]35.5% by weight butyryl; available from Eastman Chemical Company under the name CAB 381-20.
[B]CYMEL ® 303, available from Cytec Industries, Inc.
[C]Tinuvin ® 326, available from Ciba.
[D]Tinuvin ® 109, available from Ciba.
[E]Tinuvin ® 171, available from Ciba.

The dope is peeled from the stainless band support after it is dried to such an extent that it is peelable. Residual solvent in the dope is 25% at this time. The period of time required from casting to peeling of the dope is 3 minutes. After being peeled from the support, the film is dried and crosslinked at 120° C. while being held in the transverse direction. The transverse tension is then released, and drying and crosslinking are completed in a drying zone at a temperature of 120-135° C., while being transported by a number of rolls. The dried film is wound on a roll, and has a final thickness of 40 μm.

2. Preparation of Polarizing Plate

The film samples prepared in Part 1 of this example are each subjected to an alkaline treatment in a 2.5 mol/L aqueous solution of sodium hydroxide at 40° C. for 60 seconds, and washed with water for 3 minutes to form a saponified layer to prepare an alkali-treated film.

Next, a polyvinyl alcohol film (available from Kuraray Co., Ltd. under the name POVAL®) is immersed in 100 parts by weight of an aqueous solution containing 1 part by weight of iodine and 4 parts by weight of boric acid, and is stretched up to 4 times at 50° C. to obtain a polarizer film. Polarizing plate samples are prepared by laminating the foregoing alkali-treated film onto both surfaces of the polarizer film using an aqueous (5% by weight), completely saponified, polyvinyl alcohol as an adhesive.

Prophetic Example 3

1. Preparation of Dope Composition

The dope components set forth in Table 3 are charged to a closed vessel and heated to 70° C. The cellulose acetate butyrate (CAB) is completely dissolved with stirring to obtain a dope. The time required for dissolution is 4 hours.

TABLE 3

| INGREDIENT | PARTS BY WEIGHT |
| --- | --- |
| cellulose acetate butyrate[A] | 100 |
| methyl ethyl ketone | 550 |
| triphenyl phosphate | 10 |
| isocyanate crosslinking agent[B] | 25 |

[A]35.5% by weight butyryl; available from Eastman Chemical Company under the name CAB 381-20.
[B]blocked polyisocyanate based on hexamethylene diisocyanate; available from Bayer Material Science under the name DESMODUR ® BL 3370 MPA.

2. Preparation of Retardation Increasing Agent Solution

A retardation increasing agent is prepared by charging the ingredients of Table 4 to a mixing tank and stirring until each component is dissolved.

TABLE 4

| INGREDIENT | PARTS BY WEIGHT |
| --- | --- |
| tris(m-methylanilino)melamine | 20 |
| UV light absorber[A] | 0.1 |
| UV light absorber[B] | 0.1 |
| methyl ethyl ketone | 65 |
| dope composition prepared in Part 1 of this example | 15 |

[A]Tinuvin ® 327, available from Ciba.
[B]Tinuvin ® 171, available from Ciba.

3. Preparation of Matting Agent Solution

The matting agent solution is prepared by charging the ingredients set forth in Table 5 to a disperser and stirring until each of the components are dissolved. Next, 95 parts by weight of the dope composition prepared in Part 1 of this example, 1 part by weight of the matting agent solution, and 4 parts by weight of the retardation increasing agent solution are mixed until uniform. This composition is then filtered and, while being maintained at 35° C., is uniformly cast on a stainless steel band support maintained at 30° C.

TABLE 5

| INGREDIENT | PARTS BY WEIGHT |
| --- | --- |
| fumed silica[A] | 2 |
| methyl ethyl ketone | 87 |
| dope composition prepared in Part 1 of this example | 11 |

[A]Aerosil ® R972, available from Degussa AG.

4. Preparation of Optical Compensatory Film

The dope is peeled from the stainless band support after it is dried to such an extent that it is peelable. Residual solvent in the dope is 15% at this time. After being peeled from the support, the film is transversely stretched by 30% at 130° C. by means of a tenter. The film is then held at 140° C. for 30 seconds while maintaining the stretched width. The clips are removed, and the film is dried and crosslinked at 140° C. for 40 minutes. The dried optical compensatory film is wound on a roll, and has a final thickness of 50 μm.

Prophetic Example 4

1. Preparation of Dope Composition

The dope components set forth in Table 6 are charged to a closed vessel and heated to 70° C. The cellulose triacetate (CTA) is completely dissolved with stirring to obtain a dope. The time required for dissolution is 4 hours.

TABLE 6

| INGREDIENT | PARTS BY WEIGHT |
| --- | --- |
| cellulose triacetate[A] | 100 |
| methylene chloride | 475 |
| Methanol | 75 |
| triphenyl phosphate | 10 |
| melamine crosslinking agent[B] | 15 |
| p-toluene sulfonic acid | 0.4 |

[A]43.6% by weight acetyl; available from Eastman Chemical Company under the name CA 435-75S.
[B]CYMEL ® 303, available from Cytec Industries, Inc..

2. Preparation of Retardation Increasing Agent Solution

A retardation increasing agent is prepared by charging the ingredients of Table 7 to a mixing tank and stirring until each component is dissolved.

TABLE 7

| INGREDIENT | PARTS BY WEIGHT |
| --- | --- |
| tris(m-methylanilino)melamine | 20 |
| UV light absorber[A] | 0.1 |
| UV light absorber[B] | 0.1 |
| methylene chloride | 56 |
| methanol | 9 |
| dope composition prepared in Part 1 of this example | 15 |

[A]Tinuvin ® 327, available from Ciba.
[B]Tinuvin ® 171, available from Ciba.

3. Preparation of Matting Agent Solution

The matting agent solution is prepared by charging the ingredients set forth in Table 8 to a disperser and stirring until each of the components are dissolved. Next, 95 parts by weight of the dope composition prepared in Part 1 of this example, 1 part by weight of the matting agent solution, and 4 parts by weight of the retardation increasing agent solution are mixed until uniform. This composition is then filtered and, while being maintained at 35° C., is uniformly cast on a stainless steel band support maintained at 30° C.

TABLE 8

| INGREDIENT | PARTS BY WEIGHT |
| --- | --- |
| fumed silica[A] | 2 |
| methylene chloride | 75 |
| methanol | 12 |
| dope composition prepared in Part 1 of this example | 11 |

[A]Aerosil ® R972, available from Degussa AG.

4. Preparation of Optical Compensatory Film

The dope is peeled from the stainless band support after it is dried to such an extent that it is peelable. Residual solvent in the dope is 15% at this time. After being peeled from the support, the film is transversely stretched by 30% at 130° C. by means of a tenter. The film is then held at 140° C. for 30 seconds while maintaining the stretched width. The clips are removed, and the film is dried and crosslinked at 140° for 40 minutes. The dried optical compensatory film is wound on a roll, and has a final thickness of 50 μm.

Prophetic Example 5

1. Preparation of Dope Composition

The dope components set forth in Table 9 are charged to a closed vessel and heated to 70° C. The cellulose diacetate (CA) is completely dissolved with stirring to obtain a dope. The time required for dissolution is 4 hours.

TABLE 9

| INGREDIENT | PARTS BY WEIGHT |
| --- | --- |
| cellulose diacetate[A] | 100 |
| Acetone | 550 |
| triphenyl phosphate | 10 |
| melamine crosslinking agent[B] | 15 |
| p-toluene sulfonic acid | 0.4 |

[A]39.7% by weight acetyl; available from Eastman Chemical Company under the name CA 398-30.
[B]CYMEL ® 303, available from Cytec Industries, Inc..

2. Preparation of Retardation Increasing Agent Solution

A retardation increasing agent is prepared by charging the ingredients of Table 10 to a mixing tank and stirring until each component is dissolved.

TABLE 10

| INGREDIENT | PARTS BY WEIGHT |
| --- | --- |
| tris(m-methylanilino)melamine | 20 |
| UV light absorber[A] | 0.1 |
| UV light absorber[B] | 0.1 |
| acetone | 65 |
| dope composition prepared in Part 1 of this example | 15 |

[A]Tinuvin ® 327, available from Ciba.
[B]Tinuvin ® 171, available from Ciba.

3. Preparation of Matting Agent Solution

The matting agent solution is prepared by charging the ingredients set forth in Table 11 to a disperser and stirring until each of the components are dissolved. Next, 95 parts by weight of the dope composition prepared in Part 1 of this example, 1 part by weight of the matting agent solution, and 4 parts by weight of the retardation increasing agent solution are mixed until uniform. This composition is then filtered and, while being maintained at 35° C., is uniformly cast on a stainless steel band support maintained at 30° C.

TABLE 11

| INGREDIENT | PARTS BY WEIGHT |
| --- | --- |
| fumed silica[A] | 2 |
| acetone | 87 |
| dope composition prepared in Part 1 of this example | 11 |

[A]Aerosil ® R972, available from Degussa AG.

4. Preparation of Optical Compensatory Film

The dope is peeled from the stainless band support after it is dried to such an extent that it is peelable. Residual solvent in the dope is 15% at this time. After being peeled from the support, the film is transversely stretched by 30% at 130° C. by means of a tenter. The film is then held at 140° C. for 30 seconds while maintaining the stretched width. The clips are removed, and the film is dried and crosslinked at 140° C. for 40 minutes. The dried optical compensatory film is wound on a roll, and has a final thickness of 50 μm.

Control Example 6

Cellulose Diacetate Film without Crosslinker

Initially, 207.5 g of methyl ethyl ketone (MEK, obtained from Aldrich) was introduced into an 8-ounce jar, followed by 3.4 g triphenyl phosphate (TPP, 8% on solids, obtained from Aldrich) and 42.5 g cellulose diacetate (39.7% by weight acetyl, available from Eastman Chemical Co. under the name CA 398-30). The mixture was allowed to roll until a homogeneous solution was obtained. The homogeneous solution was drawn down on a clean glass plate using a square drawdown bar with a gap that was 2 inches wide and 40 mils high. Films were allowed to dry overnight before they were removed from the glass plate using a razor blade.

Control Example 7

Cellulose Acetate Propionate Film without Crosslinker

Initially, 207.5 g of MEK was introduced into an 8-ounce jar, followed by 3.4 g TPP and 42.5 g cellulose acetate propionate (46% by weight propionyl, available from Eastman Chemical Co. under the name CAP 482-20). The mixture was allowed to roll until a homogeneous solution was obtained. The homogeneous solution was drawn down on a clean glass plate using a square drawdown bar with a gap that was 2 inches wide and 40 mils high. Films were allowed to dry overnight before they were removed from the glass plate using a razor blade.

Control Example 8

Cellulose Acetate Butyrate Film without Crosslinker

Initially, 207.5 g of MEK was introduced into an 8-ounce jar, followed by 3.4 g TPP and 42.5 g cellulose acetate butyrate (35.5% by weight butyryl, available from Eastman Chemical Co. under the name CAB 381-20). The mixture was allowed to roll until a homogeneous solution was obtained. The homogeneous solution was drawn down on a clean glass plate using a square drawdown bar with a gap that was 2 inches wide and 40 mils high. Films were allowed to dry overnight before they were removed from the glass plate using a razor blade.

Example 9

Melamine, Crosslinked, Cellulose Diacetate Film

The hydroxyl content of CA 398-30 (cellulose diacetate, 39.7% by weight acetyl) is 3.5% by weight. This yields a hydroxyl equivalent weight of 486 for the solid polymer, or a hydroxyl equivalent weight of 2,857 at 17% solids as prepared in Example 6. The melamine crosslinker that was utilized was CYMEL® 303 (melamine crosslinker available from Cytec Industries, Inc.). The effective hydroxyl equivalent weight of CYMEL® 303 is in the range of 130 to 190, so a median value of 160 was chosen in order to determine stoichiometry, and one equivalent of crosslinker was utilized in this example.

In order to prepare the crosslinkable film, 23.67 g of the solution from Example 6 was combined with 1.33 g of the CYMEL® 303 and 2 drops of CYCAT® 4040 (a p-toluene sulfonic acid catalyst available from Cytec Industries, Inc.) that had been diluted 1:4 with MEK. This mixture was allowed to roll for 15 minutes and was then drawn down on a clean glass plate using a square drawdown bar with a gap that was 2 inches wide and 40 mils high. The films were allowed to dry for one hour at room temperature and were then baked for 20 minutes at 150° C. The films were removed from the glass plate using a razor blade.

Example 10

Melamine, Crosslinked, Cellulose Diacetate Film

The hydroxyl content of CA 398-30 is 3.5%. This yields a hydroxyl equivalent weight of 486 for the solid polymer, or a hydroxyl equivalent weight of 2857 at 17% solids as prepared in Example 6. The melamine crosslinker that was utilized was CYMEL® 303, from Cytec Industries, Inc. The effective hydroxyl equivalent weight is in the range of 130 to 190, so a median value of 160 was chosen in order to determine stoichiometry, and 0.5 equivalent of crosslinker was utilized in this example.

In order to prepare the crosslinkable film, 24.32 g of the solution from Example 6 was combined with 0.68 g of the CYMEL® 303 and 2 drops of CYCAT® 4040 (a p-toluene sulfonic acid catalyst available from Cytec Industries, Inc.) that had been diluted 1:4 with MEK. This mixture was allowed to roll for 15 minutes and was then drawn down on a clean glass plate using a square drawdown bar with a gap that was 2 inches wide and 40 mils high. The films were allowed to dry for one hour at room temperature and were then baked for 20 minutes at 150° C. The films were removed from the glass plate using a razor blade.

Example 11

Melamine, Crosslinked, Cellulose Acetate Propionate Film

The hydroxyl content of CAP 482-20 (cellulose acetate propionate, 46% by weight propionyl) is 1.8% by weight. This yields a hydroxyl equivalent weight of 944 for the solid polymer, or a hydroxyl equivalent weight of 5,556 at 17% solids as prepared in Example 7. The melamine crosslinker that was utilized was CYMEL® 303 (melamine crosslinker available from Cytec Industries, Inc.). The effective hydroxyl equivalent weight of CYMEL® 303 is in the range of 130 to 190, so a median value of 160 was chosen in order to determine stoichiometry, and one equivalent of crosslinker was utilized in this example.

In order to prepare the crosslinkable film, 24.30 g of the solution from Example 7 was combined with 0.70 g of the CYMEL® 303 and 2 drops of CYCAT® 4040 (a p-toluene sulfonic acid catalyst available from Cytec Industries, Inc.) that had been diluted 1:4 with MEK. This mixture was allowed to roll for 15 minutes and was then drawn down on a clean glass plate using a square drawdown bar with a gap that was 2 inches wide and 40 mils high. The films were allowed to dry for one hour at room temperature and were then baked for 20 minutes at 150° C. The films were removed from the glass plate using a razor blade.

Example 12

Melamine, Crosslinked, Cellulose Acetate Propionate Film

The hydroxyl content of CAP 482-20 (cellulose acetate propionate, 46% by weight propionyl) is 1.8% by weight. This yields a hydroxyl equivalent weight of 944 for the solid polymer, or a hydroxyl equivalent weight of 5,556 at 17% solids as prepared in Example 7. The melamine crosslinker that was utilized was CYMEL® 303 (melamine crosslinker available from Cytec Industries, Inc.). The effective hydroxyl equivalent weight of CYMEL® 303 is in the range of 130 to 190, so a median value of 160 was chosen in order to determine stoichiometry, and 0.5 equivalent of crosslinker was utilized in this example.

In order to prepare the crosslinkable film, 24.65 g of the solution from Example 7 was combined with 0.35 g of the CYMEL® 303 and 2 drops of CYCAT® 4040 (a p-toluene sulfonic acid catalyst available from Cytec Industries, Inc.) that had been diluted 1:4 with MEK. This mixture was allowed to roll for 15 minutes and was then drawn down on a clean glass plate using a square drawdown bar with a gap that was 2 inches wide and 40 mils high. The films were allowed to dry for one hour at room temperature and were then baked for 20 minutes at 150° C. The films were removed from the glass plate using a razor blade.

Example 13

Melamine, Crosslinked, Cellulose Acetate Butyrate Film

The hydroxyl content of CAB 381-20 (cellulose acetate butyrate, 35.5% by weight butyryl) is 1.8% by weight. This yields a hydroxyl equivalent weight of 944 for the solid polymer, or a hydroxyl equivalent weight of 5,556 at 17% solids as prepared in Example 8. The melamine crosslinker that was utilized was CYMEL® 303 (melamine crosslinker available from Cytec Industries, Inc.). The effective hydroxyl equivalent weight of CYMEL® 303 is in the range of 130 to 190, so a median value of 160 was chosen in order to determine stoichiometry, and one equivalent of crosslinker was utilized in this example.

In order to prepare the crosslinkable film, 24.30 g of the solution from Example 8 was combined with 0.70 g of the CYMEL® 303 and 2 drops of CYCAT® 4040 (a p-toluene sulfonic acid catalyst available from Cytec Industries, Inc.) that had been diluted 1:4 with MEK. This mixture was allowed to roll for 15 minutes and was then drawn down on a clean glass plate using a square drawdown bar with a gap that was 2 inches wide and 40 mils high. The films were allowed to dry for one hour at room temperature and were then baked for 20 minutes at 150° C. The films were removed from the glass plate using a razor blade.

Example 14

Melamine, Crosslinked, Cellulose Acetate Butyrate Film

The hydroxyl content of CAB 381-20 (cellulose acetate butyrate, 35.5% by weight butyryl) is 1.8% by weight. This yields a hydroxyl equivalent weight of 944 for the solid polymer, or a hydroxyl equivalent weight of 5,556 at 17% solids as prepared in Example 8. The melamine crosslinker that was utilized was CYMEL® 303 (melamine crosslinker available from Cytec Industries, Inc.). The effective hydroxyl equivalent weight of CYMEL® 303 is in the range of 130 to 190, so a median value of 160 was chosen in order to determine stoichiometry, and 0.5 equivalent of crosslinker was utilized in this example.

In order to prepare the crosslinkable film, 24.65 g of the solution from Example 8 was combined with 0.35 g of the CYMEL® 303 and 2 drops of CYCAT® 4040 (a p-toluene sulfonic acid catalyst available from Cytec Industries, Inc.) that had been diluted 1:4 with MEK. This mixture was allowed to roll for 15 minutes and was then drawn down on a clean glass plate using a square drawdown bar with a gap that was 2 inches wide and 40 mils high. The films were allowed to dry for one hour at room temperature and were then baked for 20 minutes at 150° C. The films were removed from the glass plate using a razor blade.

Comparative Example 15

Isocyanate, Crosslinked Cellulose Acetate Propionate Film

The hydroxyl content of CAP 482-20 (cellulose acetate propionate, 46% by weight propionyl) is 1.8% by weight. This yields a hydroxyl equivalent weight of 944 for the solid polymer, or a hydroxyl equivalent weight of 5,556 at 17% solids as prepared in Example 7. The isocyanate crosslinker that was utilized was DESMODUR® BL 3272 MPA (available from Bayer), a blocked isocyanate that is delivered at 72% solids in 1-methoxypropyl-acetate-2. The effective hydroxyl equivalent weight is 410, and one equivalent of crosslinker was utilized in this example.

In order to prepare the crosslinkable film, 23.28 g of the solution from Example 7 was combined with 1.72 g of the DESMODUR® BL 3272 MPA. This mixture was allowed to roll for 15 minutes and was then drawn down on a clean glass plate using a square drawdown bar with a gap that was 2 inches wide and 40 mils high. The films were allowed to dry for one hour at room temperature and were then baked for 40 minutes at 165° C. The films were removed from the glass plate using a razor blade.

Comparative Example 16

Isocyanate, Crosslinked Cellulose Acetate Propionate Film

The hydroxyl content of CAP 482-20 (cellulose acetate propionate, 46% by weight propionyl) is 1.8% by weight. This yields a hydroxyl equivalent weight of 944 for the solid polymer, or a hydroxyl equivalent weight of 5,556 at 17% solids as prepared in Example 7. The isocyanate crosslinker that was utilized was DESMODUR® BL 3272 MPA (available from Bayer), a blocked isocyanate that is delivered at 72% solids in 1-methoxypropyl-acetate-2. The effective hydroxyl equivalent weight is 410, and 0.5 equivalent of crosslinker was utilized in this example.

In order to prepare the crosslinkable film, 24.11 g of the solution from Example 7 was combined with 0.89 g of the DESMODUR® BL 3272 MPA. This mixture was allowed to roll for 15 minutes and was then drawn down on a clean glass plate using a square drawdown bar with a gap that was 2 inches wide and 40 mils high. The films were allowed to dry for one hour at room temperature and were then baked for 40 minutes at 165° C. The films were removed from the glass plate using a razor blade.

Comparative Example 17

Isocyanate, Crosslinked Cellulose Acetate Butyrate Film

The hydroxyl content of CAB 381-20 (cellulose acetate butyrate, 35.5% by weight butyryl) is 1.8% by weight. This yields a hydroxyl equivalent weight of 944 for the solid polymer, or a hydroxyl equivalent weight of 5,556 at 17% solids as prepared in Example 8. The isocyanate crosslinker that was utilized was DESMODUR® BL 3272 MPA (available from Bayer), a blocked isocyanate that is delivered at 72% solids in 1-methoxypropyl-acetate-2. The effective hydroxyl equivalent weight is 410, and one equivalent of crosslinker was utilized in this example.

In order to prepare the crosslinkable film, 23.28 g of the solution from Example 8 was combined with 1.72 g of the DESMODUR® BL 3272 MPA. This mixture was allowed to roll for 15 minutes and was then drawn down on a clean glass plate using a square drawdown bar with a gap that was 2 inches wide and 40 mils high. The films were allowed to dry for one hour at room temperature and were then baked for 40 minutes at 165° C. The films were removed from the glass plate using a razor blade.

Comparative Example 18

Isocyanate, Crosslinked Cellulose Acetate Butyrate Film

The hydroxyl content of CAB 381-20 (cellulose acetate butyrate, 35.5% by weight butyryl) is 1.8% by weight. This yields a hydroxyl equivalent weight of 944 for the solid polymer, or a hydroxyl equivalent weight of 5,556 at 17% solids as prepared in Example 8. The isocyanate crosslinker that was utilized was DESMODUR® BL 3272 MPA (available from Bayer), a blocked isocyanate that is delivered at 72% solids in 1-methoxypropyl-acetate-2. The effective hydroxyl equivalent weight is 410, and 0.5 equivalent of crosslinker was utilized in this example.

In order to prepare the crosslinkable film, 24.11 g of the solution from Example 8 was combined with 0.89 g of the DESMODUR® BL 3272 MPA. This mixture was allowed to roll for 15 minutes and was then drawn down on a clean glass plate using a square drawdown bar with a gap that was 2 inches wide and 40 mils high. The films were allowed to dry for one hour at room temperature and were then baked for 40 minutes at 165° C. The films were removed from the glass plate using a razor blade.

Analysis and Results

1. Analytical Methods

Film thicknesses of the cured, dry films were determined using a Metricon 2010M Prism Coupler at a wavelength of 633 nm. The storage modulus (E) was obtained by Dynamic Mechanical Thermal Analysis (DMTA) run in tension mode with a 1 Hz frequency, a strain of 0.1%, and a temperature ramp rate of 5° C. per minute from −50° C. to 250° C.

2. Results

TABLE 12

Inventive Films of Examples 6-14 (melamine crosslinker)

| EXAMPLE NO. | CELLULOSE | CROSSLINKER EQUIVALENTS | FILM THICKNESS (µm) | E' (25° C.)[4] | TEMPERATURE AT E' MINIMUM (° C.) | E' MINIMUM |
|---|---|---|---|---|---|---|
| 6 | cellulose diacetate | 0 (control) | 88 | $3.58 \times 10^9$ | 176.78 | $1.84 \times 10^7$ |
| 9 | cellulose diacetate | 1 | 85 | $3.30 \times 10^9$ | 171.10 | $3.38 \times 10^7$ |
| 10 | cellulose diacetate | 0.5 | 87 | $3.27 \times 10^9$ | 178.01 | $3.80 \times 10^7$ |
| 7 | cellulose acetate propionate | 0 (control) | 75 | $2.39 \times 10^9$ | 140.66 | $5.05 \times 10^6$ |
| 11 | cellulose acetate propionate | 1 | 92 | $2.08 \times 10^9$ | 143.38 | $5.91 \times 10^6$ |
| 12 | cellulose acetate propionate | 0.5 | 85 | $2.12 \times 10^9$ | 148.62 | $7.27 \times 10^6$ |
| 8 | cellulose acetate butyrate | 0 (control) | 90 | $2.29 \times 10^9$ | 134.81 | $6.05 \times 10^6$ |
| 13 | cellulose acetate butyrate | 1 | 93 | $1.89 \times 10^9$ | 152.29 | $1.32 \times 10^7$ |
| 14 | cellulose acetate butyrate | 0.5 | 87 | $1.94 \times 10^9$ | 147.38 | $6.68 \times 10^6$ |

[4] E' refers to the storage modulus of the film.

TABLE 13

Films of Comparative Examples 15-18 (isocyanate crosslinker)

| EXAMPLE NO. | CELLULOSE | CROSSLINKER EQUIVALENTS | FILM THICKNESS (µm) | E' (25° C.)[4] | TEMPERATURE AT E' MINIMUM (° C.) | E' MINIMUM |
|---|---|---|---|---|---|---|
| 7 | cellulose acetate propionate | 0 (control) | 75 | $2.39 \times 10^9$ | 140.66 | $5.05 \times 10^6$ |
| 15 | cellulose acetate propionate | 1 | 88 | $2.25 \times 10^9$ | — | — |
| 16 | cellulose acetate propionate | 0.5 | 84 | $2.11 \times 10^9$ | — | — |
| 8 | cellulose acetate butyrate | 0 (control) | 90 | $2.29 \times 10^9$ | 134.81 | $6.05 \times 10^6$ |
| 17 | cellulose acetate butyrate | 1 | 90 | $2.12 \times 10^9$ | — | — |
| 18 | cellulose acetate butyrate | 0.5 | 89 | $1.92 \times 10^9$ | — | — |

[4] E' refers to the storage modulus of the film.

In a crosslinked film, the storage modulus, E' will decrease at the glass transition temperature and will hit some minimum (E' minimum), at which point E' will increase with increasing temperature. If a film is not crosslinked, it will essentially flow apart above the glass transition temperature. In such instances, there will not be an E' minimum.

As evidenced by the data in Table 12, the films prepared using melamine crosslinking agents exhibited an E minimum, which is indicative of significant crosslinking. However, as shown by the data in Table 13, the films prepared using blocked isocyanate crosslinkers did not. Thus, the blocked isocyanate-containing films would not be acceptable for use in the present invention, while the melamine-containing films would work well.

We claim:

1. A method of forming a polarizing plate for use in optical display devices, said method comprising:
providing a polarizing film having first and second outer surfaces; and applying a companion film to at least one of said first and second outer surfaces, said companion film comprising a cellulose crosslinked with a crosslinking agent, said cellulose being selected from the group consisting of cellulose ethers and cellulose esters, and said crosslinking agent having the formula

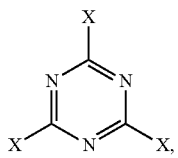

wherein:
each X is individually selected from the group consisting of phenyl groups and $-NR_2$, where each R is individually selected from the group consisting of hydrogen, alkoxyalkyl groups, carboxyl groups, alkoxy groups, and hydroxymethyl groups; and
at least one X being $-NR_2$ and at least one R being selected from the group consisting of alkoxyalkyl groups, carboxyl groups, alkoxy groups, and hydroxymethyl groups.

2. The method plate of claim 1, wherein each X is $-NR_2$.

3. The method of claim 1, wherein each R is selected from the group consisting of alkoxyalkyl groups, carboxyl groups, alkoxy groups, and hydroxymethyl groups.

4. The method of claim 3, wherein each R is an alkoxyalkyl group.

5. The method of claim 2, wherein each X is $-NR_2$, and each R is a methoxymethyl group.

6. The method of claim 1, wherein said polarizing film comprises a polyvinyl alcohol film.

7. The method of claim 1, wherein said cellulose comprises a cellulose ester.

8. The method of claim 7, wherein said cellulose ester comprises a $C_1$-$C_{20}$ ester of cellulose.

9. The method of claim 7, wherein said cellulose ester is selected from the group consisting of cellulose acetate, cellulose triacetate, cellulose acetate phthalate, cellulose acetate butyrate, cellulose butyrate, cellulose tributyrate, cellulose propionate, cellulose tripropionate, cellulose acetate propionate, carboxymethylcellulose acetate, carboxymethylcellulose acetate propionate, carboxymethylcellulose acetate butyrate, cellulose acetate butyrate succinate, cellulose propionate butyrate, and mixtures thereof.

10. The method of claim 1, wherein said companion film is selected from the group consisting of protective films, compensation films, and mixtures thereof.

11. The method of claim 10, wherein said companion film is supported on at least one of said first and second outer surfaces via an adhesive.

12. The method of claim 10, wherein said companion film is adjacent to at least one of said first and second outer surfaces without the use of an adhesive.

13. A method of forming a polarizing plate for use in optical display devices, said method comprising:
providing a polarizing film having first and second outer surfaces; and
applying a companion film to at least one of said first and second outer surfaces, said companion film comprising a cellulose crosslinked with a crosslinking agent, said cellulose being selected from the group consisting of cellulose ethers and cellulose esters, and said crosslinking agent:
comprising at least one group having the formula $-OR'$, where R' is an alkyl; and
being free of epoxy groups and groups having the formula

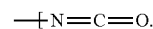

14. The method of claim 13, wherein R' is selected from the group consisting of $C_2$-$C_4$ alkyls.

15. The method of claim 13, wherein said polarizing film comprises a polyvinyl alcohol film.

16. The method of claim 13, wherein said cellulose comprises a cellulose ester.

17. The method of claim 16, wherein said cellulose ester comprises a $C_1$-$C_{20}$ ester of cellulose.

18. The method of claim 16, wherein said cellulose ester is selected from the group consisting of cellulose acetate, cellulose triacetate, cellulose acetate phthalate, cellulose acetate butyrate, cellulose butyrate, cellulose tributyrate, cellulose propionate, cellulose tripropionate, cellulose acetate propionate, carboxymethylcellulose acetate, carboxymethylcellulose acetate propionate, carboxymethylcellulose acetate butyrate, cellulose acetate butyrate succinate, cellulose propionate butyrate, and mixtures thereof.

19. The method of claim 13, wherein said companion film is selected from the group consisting of protective films, compensation films, and mixtures thereof.

20. The method of claim 19, wherein said companion film is supported on at least one of said first and second outer surfaces via an adhesive.

21. The method of claim 19, wherein said companion film is adjacent to at least one of said first and second outer surfaces without the use of an adhesive.

22. The method of claim 13, wherein said crosslinking agent comprises a triazine crosslinking agent.

* * * * *